Feb. 14, 1967     F. ZAWISTOWSKI     3,303,731
TEMPERATURE CONTROLLED LATHE

Filed Aug. 17, 1965     3 Sheets-Sheet 1

INVENTOR.
FERDYNAND ZAWISTOWSKI

BY

*Bierman & Bierman*

ATTORNEYS

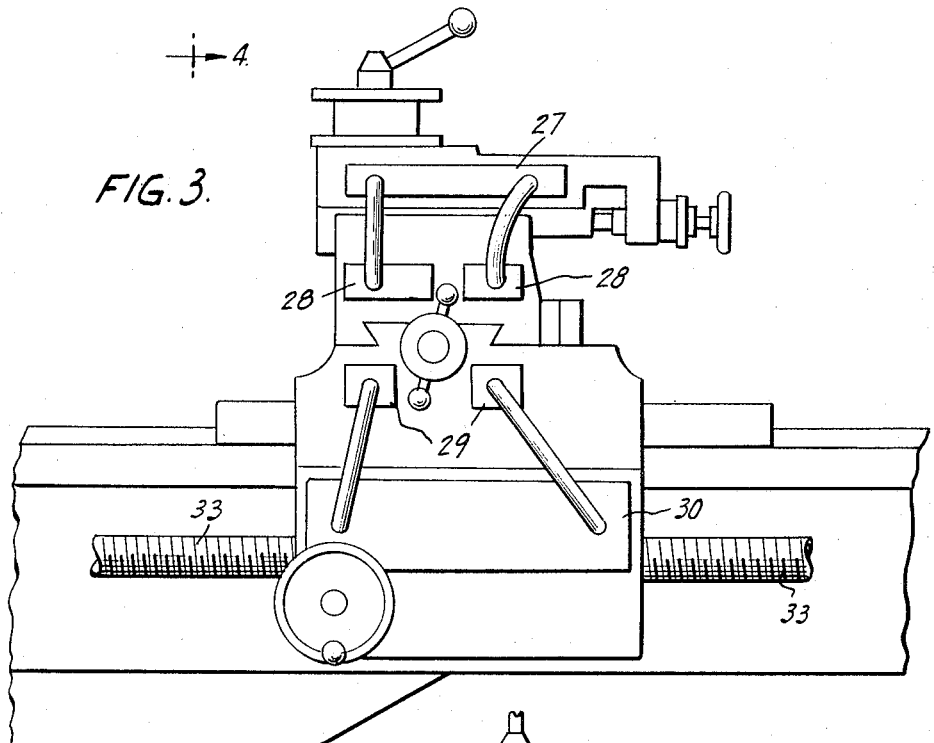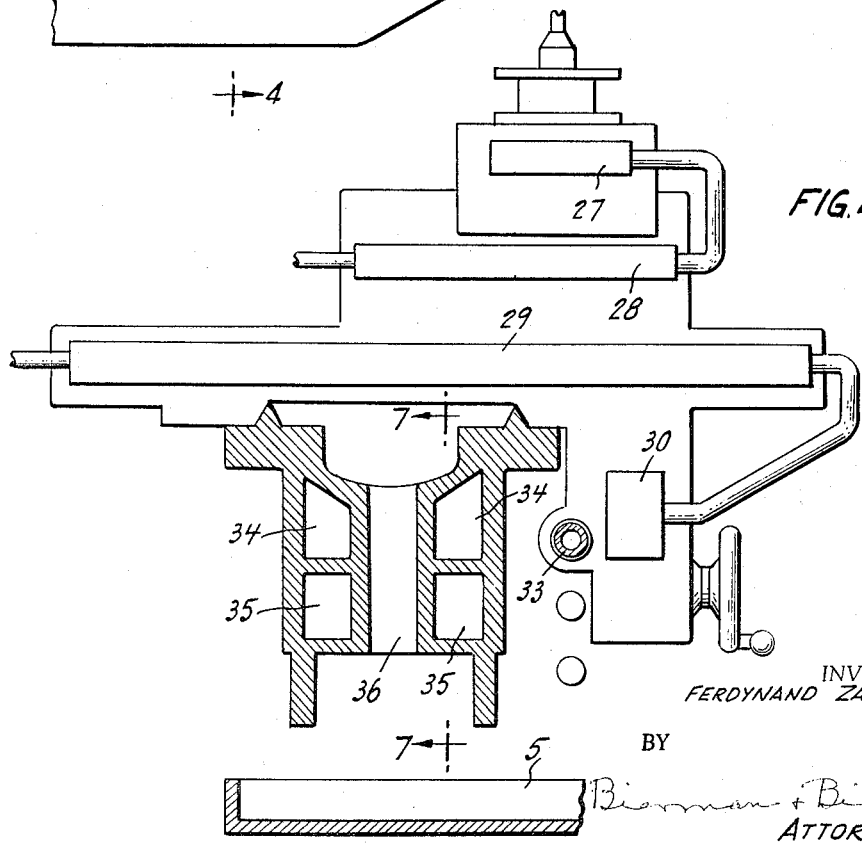

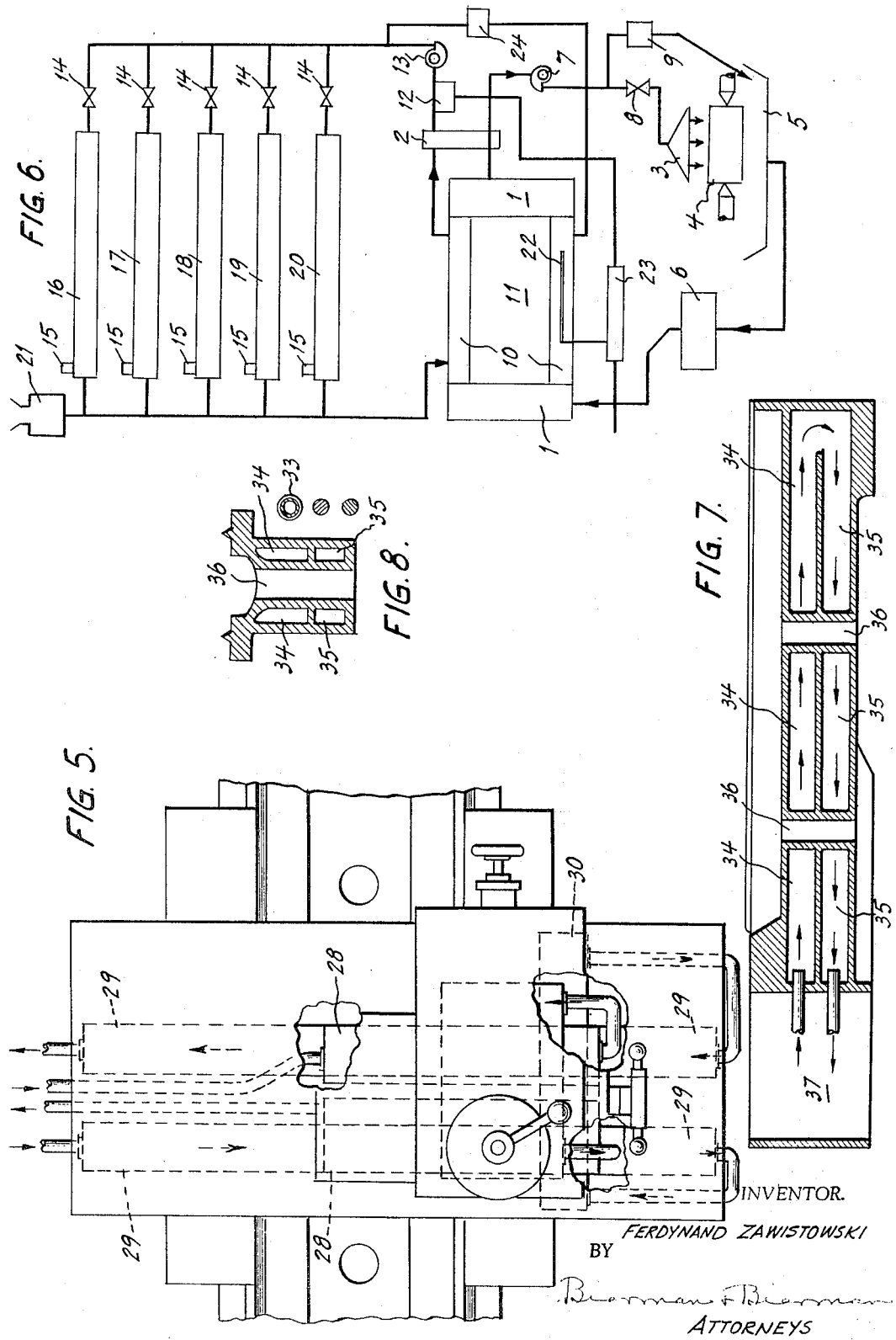

United States Patent Office 3,303,731
Patented Feb. 14, 1967

3,303,731
TEMPERATURE CONTROLLED LATHE
Ferdynand Zawistowski, Aviva St. 62,
Ramat Remes, Israel
Filed Aug. 17, 1965, Ser. No. 480,361
16 Claims. (Cl. 82—2)

This application is a continuation-in-part of copending application Serial No. 292,877, filed July 5, 1963.

The invention is directed to improvements in the design of precision machine tools and size measuring instruments which make it possible to control precisely the temperature of all basic components of machine-workpiece-tool or instrument-workpiece-measuring stylus closed dimensional circuits, and in a manner to avoid the errors in machining or measuring accuracy due to the thermal expansion or contraction of particular components of the circuit.

The present design of machine tools imposes severe limitation on the machining accuracy which may be achieved. This is basically due to two phenomena: the first is the elasticity of machine tool components and the second the insufficient temperature control during the process itself.

The first cause of inaccuracy in machining may be comparatively easy to overcome by the suitable rigid design of particular components or by decreasing the forces acting during the process.

The second cause still exists and limits our machining possibilities so that it was necessary to eliminate from the new ISO Fits and Tolerances Standard Proposition all the grades of tolerances below 7th in the range of diameters 500–3150 mm.

The given reason was that the instability of temperature conditions during machining and measuring makes it practically impossible to achieve the accuracy in the grades finer than 7.

More detailed analysis shows that the following conditions limit the present machining accuracy: the workshop's temperature, the temperature of the machine tool body, the temperature of tool and tool holder, the temperature of machined parts (including centers and chucks) and the temperature of coolant (cutting fluid).

It is obvious that in conditions today accepted as normal and typical none of these temperatures can be assumed constant and for the following reasons:

(a) The temperature of the workshop is the function of day time (including solar radiation intensivity on the roof), external temperature, heating or cooling intensity, gate opening period and amounts of materials introduced during the day from the areas of other temperature. Keeping the workshop temperature in close tolerances as it is done in standard rooms seems to be rather costly (specially for the very big machines) and is practically out of consideration for the average industry. Apart from this, it will not be very helpful for the control of the machined component's temperature in the case of high output machining as the heat generated in the machining process will not be evacuated quickly enough.

(b) The temperatures of the machine tool is the function of primary temperature of the machine, amount of heat generated by the friction in bearings and slides, heat generated in cutting action, temperature of cutting fluids and the cutting fluid evaporation intensity on the machine tools outer surfaces.

(c) The above present conditions corresponding to some extent to the tool and toolholder.

(d) The temperature of the machined component is the most difficult parameter to control and in most cases is practically out of control. Here any change in temperature or more exactly any temperature difference between the part being machined and the machine tool causes considerable inaccuracies in the final dimensions of the machined components. The same results when we want to measure the component while still in the chuck.

The above presented difficult situation is partly solved by detailed control of the machining room temperature and by refrigeration of the cutting fluid.

The last system proved to be satisfactory only in the case of circular grinding of small components (little shafts and the like) where the grindings and the measurements are done simultaneously in the same stream of coolant (cooling fluid) and the temperature of machine tool has very litle or no influence at all on the accuracy achieved (and this is specially true in the feedback system). Besides, this system is a rather costly one as the refrigeration is most expensive energy conversion process and probably this is the basic reason for its very limited application.

The application of the so called "run-in" period which is often mentioned in the literature does not solve the problem as well and this for the following reason: The conception of the "Run in" period is to run the machine tool without (or sometimes with) load for a given time (some to several hours) until some balance and steady state of temperatures will be achieved. The power delivered to the machine tool running without any load is is fully consumed by the heat generation in the different places of friction (slides, bearings and so on). Unfortunately this system has two basic deficiencies for all machine tools other as grinders. The first deficiency occurs when the loading of the machine tools is started; apart of the additional heat generated by cutting process itself, additional loads occur in all bearing surfaces due to the cutting forces, causing addtional heat generation (in bearings and slides) and thus outbalance the previous temperature balance achieved in the "run-in" period. The second deficiency is based on the fact that the given temperature balance of machine tool has little or no influence on the machined part when the machining process is started and obviously not at all while the process is in progress.

The basic object of my invention is to solve the problem and to achieve the machining accuracies postulated by the today's demands of precision engineering machining systems and by tomorrow's demands of general machining systems. In the present specification the following characteristics of machine tools and especially precision machine tools design are proposed as new invention:

(1) The whole machine tool's body as well as all its basic components, steady and moving, will be fluid (usually water with corrosion inhibitors) jacketed.

(2) In some special cases where only selected components of machine tool form the closed circuit of dimensional tolerances, as in the case of broaching machine or open drillers, the fluid jacketing may and will be limited to only these components.

(3) The whole fluid will circulate in the closed circuit where its temperature will be controlled by the suitable (usually very small) heater and temperature control device.

(4) The temperature of the system will be kept slightly above room (workshop) temperature in order to avoid unnecessary overheating and the use of refrigeration as it would be necessary in the case of cooling. In the proposed system the cooling of the whole machine for special cases will be possible but it will be much more costly as the heating up, and for this reason it should be avoided if possible.

(5) In special exchangers the heat exchanges will be provided between the heating fluid circulating in the machine body and the cutting fluid (coolant) in order to provide the same temperature of both fluids and consequently the whole machining process.

(6) Whenever the highest accuracy of machining will be necessary in order to avoid the smallest difference between the temperature of the heating and cutting fluids, which for the operation of the heat exchanger cannot be infinitely small, only one fluid will be used. In this case the fluid will fulfill two duties, namely that of heating and that of cooling (cutting fluid). In this case the correct filtration of the fluid before entering the machine inner canals will be essential.

(7) The machined component will be under constant stream of cutting fluid while machined. In this way the machined workpiece will have always exactly the same temperature as the coolant (cutting fluid) and consequently (due to the heat exchanger) as the whole machine tool.

(8) In selected cases the machined component may be fully immersed in cutting fluid (or oil) and thus the full control of its temperature, provided.

The above listed rules correspond also to the temperature compensated Size Measuring Instrument, except for the coolant's circuit.

The invention represents the following advantages of proposed machine tools design as compared to the present day situation:

(1) Full temperature control of machining process, thus eliminating among other any risk of overheating of the workpiece or the tool.

(2) No thermal expansion or contraction of any part of the system will occur.

(3) The machining of large components to the high standard of accuracy will be possible (practically up to the grades 4 and 5 and of ISA System of Fits and Tolerances) without special difficulties, as any possible size deviations due to the thermal expansion or contraction of the components are avoided.

(4) The measuring of large components will be possible while machined. At present the component heated up during machining must be cooled for measurement, so it blocks the machine or must be clamped out of it for the cooling time.

(5) The necessity of keeping controlled temperature rooms will be practically limited to the standard rooms and laboratories while the high standard of accuracy will be attained in the normal industrial space.

(6) The control of the temperature of the machine tool will be much cheaper and much more efficient than the whole workshop.

(7) The production of high accuracy measuring screws of comparatively big sizes for micrometers and other measuring machines will be possible with sufficient accuracy as the machine tool (including its leading screws) and machined component will be at the same temperature during the whole process and the laborious correction system will be avoided.

The invention will be more fully described in connection with the accompanying drawings constituting a part hereof and in which like reference characters indicate like parts, and wherein, FIG. 1 is a front elevational view of a lathe having the liquid temperature control system of the present invention;

FIG. 3 is an enlarged elevational view of the lathe of FIG. 1;

FIG. 4 is a transverse section on 4—4 of FIGURE 3;

FIG. 5 is an enlarged top view of FIGURE 3;

FIG. 6 is a diagrammatic view of the cooling system, and

Figure 1:
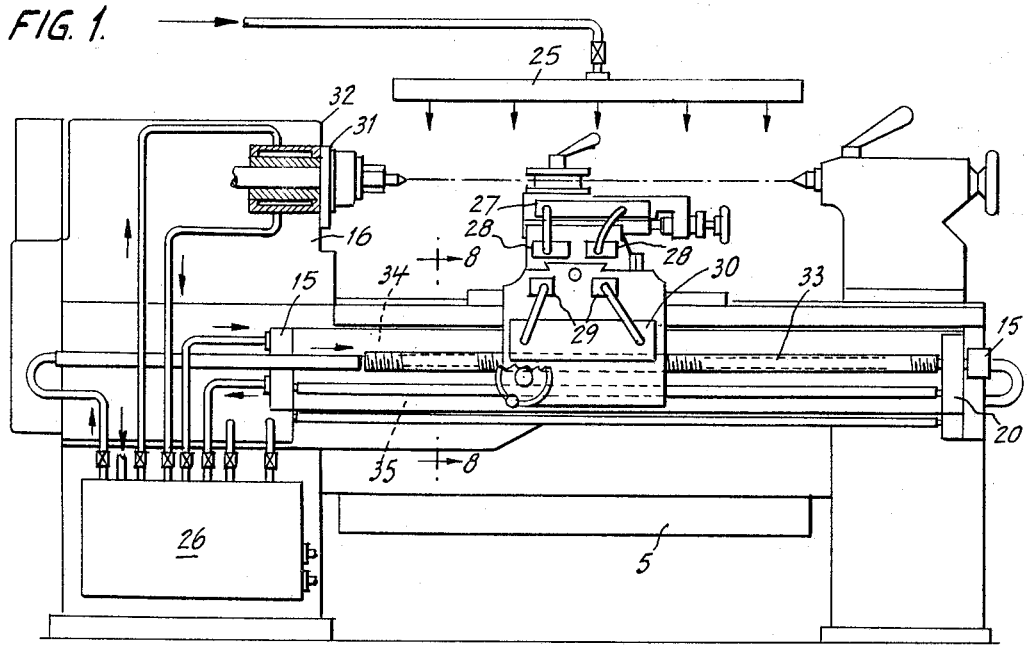

FIGS. 7 and 8 are sections along lines 7—7 of FIG. 4 and 8—8 of FIG. 1, respectively.

In the drawings the application of the present invention in the design of precision lathe is shown. Although only the precision lathe has been illustrated in this patent specification, it is to be understood that the invention is adaptable for application to any other conventional or specialized machine tool as well to any size measuring instruments where the accuracy of operation depends primarily on the control which is exercised on the position and size of an object component (workpiece or the like) to be machined or measured and on the position and size of an operative component (cutting tool, measuring stylus or the like).

In FIGS. 1 to 5 a schematic location of equipment in the precision lathe is presented using different projection and cutouts of the lathe where on FIG. 6 the circuits in this temperature controlled lathe are presented in diagrammatic form. There are two fluid circuits, namely the coolant (cooling fluid) circuit and the circulation fluid circuit.

The circulating fluid acts only as a heat carrying medium and does not come into contact with the machined component and swarfs. In such a way it will always remain clean and no filtering or cleaning will be necessary.

As seen in FIG. 6 the precision lathe is provided with five liquid circulating regions 16, 17, 18, 19 and 20, the regions being respectively located in the body of the main spindle bearings in the tool and cross supports in the main support, in the main feed screw and in the main body of the lathe. A temperature controlling liquid is passed through each of these regions by a pump 13, the circulating liquid passing into each region via a regulating valve 14. The liquid after passing through each region flows into and through a heat exchanger 11 and from the said heat exchanger 11 via a temperature difference indicator 2 and temperature control device 12 to the inlet of the pump.

The outlet of each circulating region is connected to an overflow tank 21. Each region is equipped with a temperature indicator 15. The outlet of the pump 13, on the other hand, is coupled via a safety valve 24 to the heat exchanger.

A pump 7 pumps the coolant (cutting fluid) via a regulating valve 8 to a set of spraying nozzles 3, from where is it sprayed onto a machined work piece 4. The spent coolant flows from a collector 5 through a filter 6 into the heat exchanger 11 where it circulates in heat exchange but out of direct contact with the circulating liquid. The coolant passes out of the heat exchanger 11 through the temperature difference indicator 2 back to the inlet of the pump 7. The outlet of the pump 7 is connected via a safety valve 9 to the collector 5.

The heat exchanger is provided with an electric heater 22 which is supplied with heating electric current via an electric switch 23. The switch 23 is coupled to the temperature control device 12 so as to be actuated thereby.

In use the circulating liquid (usually but not always water with some corrosion inhibitors) passes through the various circulating regions under the influence of the pump 13. Adjustment of the regulating valve 14 in accordance with the flow resistance of the various regions ensures that the circulating liquid passes through each region at substantially the same rate. The correct circulation of the liquid may be supervised with the help of temperature indicators 15 assembled in every region.

By virtue of the heat exchange between the circulating liquid and the coolant, those two liquids as they emerge from the heat exchanger should be substantially at the same temperature. Any difference in the temperature of the two emerging liquids is detected by the indicator 2. In the event that the emerging circulating liquid is below a predetermined temperature, the control device 12 operates so as to actuate the switch 23 whereupon the heating electric current is supplied to the electric heater 22 and the circulating liquid is heated up to the required level.

The heat exchanger itself contains some space for the coolant 1, for the circulating liquid 10 and finally the main heat exchange space 11 where the exchange of heat between the coolant and the circulating fluid will be performed.

In FIG. 1 the general view of the precision lathe is given. In order to simplify the design of the lathe the heat exchanger assembly 26 will be built and located as one unit in the main leg of the lathe. The heat exchanger assembly will contain the heat exchanger itself, temperature difference indicator, temperature control device, pumps and safety valves for both liquids, filters for coolant and all the regulation valves.

In the main body of the lathe in FIG. 1 the first region of the circulating liquid is represented by the large channels 34 and 35 for the liquid flowing in and back. In the center of the main body two channels 36 are provided for the evacuation of the coolant and the swarfs, from the machining area to the gathering tank 5.

The second region of the circulating liquid contain the main spindle body with the main bearing 31 and surrounding liquid coat space 32 connected to the heat exchanger assembly 26 by the pipes.

For the lathe's gearbox the space 37 is reserved.

In the third region the circulating liquid flows through the leading screw 33.

Figure 2:
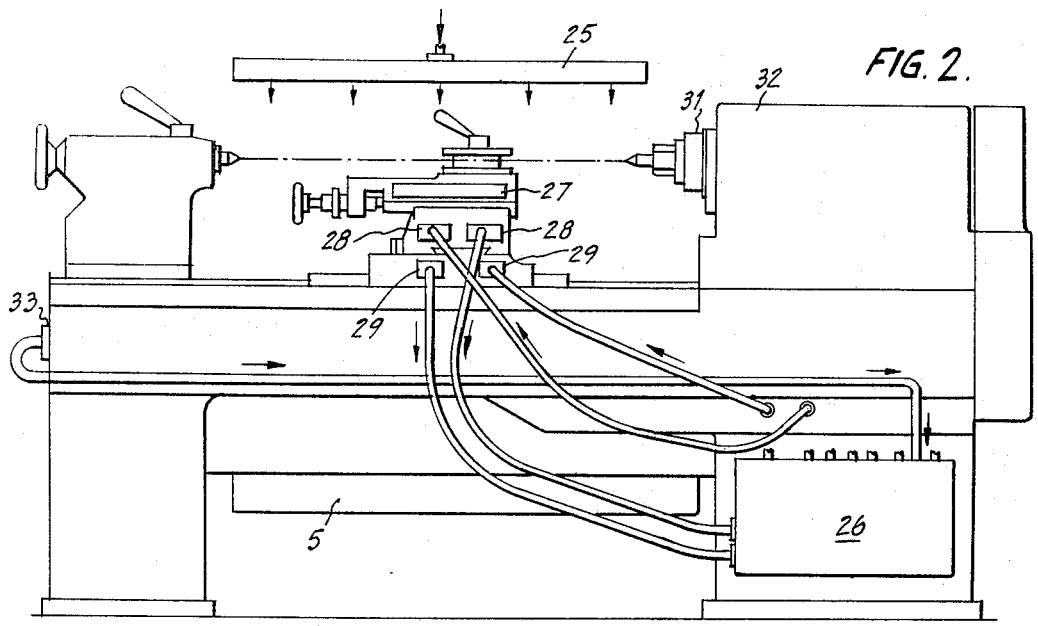
FIG. 2 is a rear elevational view similar to FIG. 1 in which only part of the temperature control system is present.

In FIG. 2 presenting the same lathe from behind, the flexible pipes can be seen, which lead the circulating liquid to the supports, which are the moving parts of the lathe.

Details of the lathe supports and their liquid jacketings can be seen on FIG. 3 representing the front view of the supports, FIG. 4 representing the left view of the supports assembly and FIG. 5 showing the supports from above. The fourth region of circulating liquid contains the main support with three jacketing spaces namely one in the vertical part of the main support 30 and two in the horizontal part of it 29.

The fifth region contains one jacketing space in tool support 27 and two spaces in cross support 28.

The coolant nozzles 25 are shown in FIG. 1; they should be suitably formed for a given group of components and their sizes in order to provide the full covering of the machined component by the coolant.

In this way it is ensured that the workpiece, tool and all the constituent components of the closed circuit of the lathe are maintained at a substantially constant temperature and are therefore not subject to variations of size and location.

Furthermore in the particular example described above, by virtue of the simultaneous temperature control of the feed screw and of the workpiece micrometer screws of unlimited length can be produced.

Having now particularly described and ascertained the nature of my said invention and in what manner the same is to be performed, I declare that what I claim is:

1. In a precision machine tool a system for maintaining uniform temperature of all essential parts of said tool and of the work which comprises a heat exchanger inlet, piping in said heat exchanger for the flow therethru of circulating fluid, an inlet into said heat exchanger for flow of coolant in contact with said piping, an outlet from said heat exchanger for the coolant extending to the work, a return duct from the work to said inlet for coolant, an outlet conduit from said piping, a plurality of fluid circulating conduits each of which is located in the body of a machine element, said fluid circulating conduits having one end in parallel connection to said piping outlet, the other end of said fluid circulating conduits being connected to said inlet piping, a temperature difference indicator in circuit with both of the outlets for the fluid and the coolant to detect temperature difference therebetween, a temperature control unit in said piping outlet, an electric heating element in said heat exchanger for heating both the fluid and the coolant, a switch, an electric connection from said temperature control thru said switch to said heating element, for controlling said heater in accordance with the temperature difference control indications to maintain the temperatures of coolant and of fluid in said heat exchanger at substantially the same point.

2. In a precision machine tool a system for maintaining uniform temperature of all parts of said machine tool, as described in claim 1, wherein the flow of said circulating liquid moving through each of said moving portions is controlled by a separate regulating valve on each of said moving portions, and the temperature of said circulating liquid being measured at the outlet of each of said moving portions by a temperature indicator.

3. In a precision machine tool a system for maintaining uniform temperature of all parts of said machine tool, as described in claim 2 wherein the outlet of each of said moving portions being connected to an overflow tank and the circulating pump of said circulating liquid being connected by a safety valve to said heat exchange and control device.

4. In a precision machine tool a system for maintaining uniform temperature of all parts of said machine tool, as described in claim 3, wherein a pump for circulating said cutting fluid through a regulating valve, a set of spray nozzles where it is sprayed onto the work piece, whence it flows into a collector box, through a filter into said heat exchange and control device in heat exchange relationship with but out of direct contact with said circulating liquid through a temperature differential indicator and back to said pump.

5. A precision machine tool according to claim 1 in which the same liquid is circulated thru said body and over the work.

6. The precision machine tool according to claim 1 in which a fluid circulating conduit is located in each of the body of the main spindle bearings, the tool and cross supports, the main support, the main feed screw and the main body.

7. Apparatus of the kind specified having means for controlling the temperature of the constituent components of the closed circuit of dimensions by the circulation of temperature controlling liquid in good thermal contact with the constituent components and means for maintaining said liquid at a substantially constant temperature, said apparatus comprising a machine tool body and bed, a spindle rotatably holding a machine tool and main and cross supports, a coolant pump, a connection from said pump to each of said elements for circulating controlling coolant in contact therewith, a heat exchanger, exit from said elements being connected to said heat exchanger and a return therefrom to said pump, a heater for said heat exchanger and a temperature control for said heater in one of said connections, a fluid circulating system having a fluid pump with connections for spraying on a work piece and a return to said exchanger in indirect contact with coolant and back to said fluid pump said coolant flowing substantially simultaneously thru said elements, whereby they are maintained at approximately the same temperature.

8. Apparatus according to claim 7, where a single continuous liquid circulating circuit is provided.

9. A machine tool according to claim 8, wherein said circulating circuit includes a set of spray nozzles from which the workpiece and the tool can be sprayed with said controlling liquid, a collector for collecting spent sprayed liquid, filter means through which said spent liquid passes prior to re-circulation and pump means for circulating said controlling liquid through the circulating circuit.

10. A machine tool according to claim 7, wherein two liquid circulating circuits are provided, a first circulating circuit including a set of spray nozzles from which the workpiece and the tool can be sprayed with temperature controlling liquid, a collector for collecting spent sprayed liquid, filter means through which the spent liquid passes prior to its passage through a heat exchanger and recirculation and first pump means for circulating the controlling liquid through the first circulating circuit, a second circulating circuit which extends through the constituent components of the machine tool other than the workpiece and tool and which includes said heat exchanger, said heat exchanger being provided with means actuatable by a temperature controller located in one or both said circuits for ensuring that said controlling liquid circulates at a predetermined temperature.

11. A machine tool according to claim 7, wherein said controlling liquid is water.

12. A hydraulically operated machine tool according to claim 7, wherein said controlling liquid is constituted by a hydraulic liquid.

13. A machine tool according to claim 7, wherein said coolant is constituted by the bearing oil.

14. A machine tool according to claim 7, wherein said controlling liquid is maintained at a temperature above that of the surrounding air.

15. A machine tool according to claim 7, characterized in that a temperature difference indicator is inserted in both the coolant and the fluid circulating systems and said control is adapted to actuate said heater.

16. A machine tool according to claim 7, characterized in that said coolant pump is connected into a circulating circuit thru heat exchanger and said control.

References Cited by the Examiner

UNITED STATES PATENTS

| | | |
|---|---|---|
| 1,112,269 | 9/1914 | Crellin. |
| 2,279,569 | 4/1942 | Jelinek et al. |
| 2,380,747 | 7/1945 | Goetze. |
| 2,606,747 | 8/1952 | Williams _____ 165—27 |
| 2,921,364 | 1/1960 | Petzoldt. |

FOREIGN PATENTS 559,881   3/1944   Great Britain.

WILLIAM W. DYER, JR., *Primary Examiner.*

L. VLACHOS, *Examiner.*